United States Patent
Alsayyed Ahmad et al.

(10) Patent No.: US 9,769,638 B2
(45) Date of Patent: Sep. 19, 2017

(54) SAFETY HELMET AND VEHICLE SYSTEM, CIRCUIT AND DEVICE

(71) Applicant: United Arab Emirates University, Al Ain (AE)

(72) Inventors: Basel Alsayyed Ahmad, Al Ain (AE); Ahmed Altelbani, Al Ain (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 14/948,348

(22) Filed: Nov. 22, 2015

(65) Prior Publication Data

US 2017/0150333 A1 May 25, 2017

(51) Int. Cl.
| | | |
|---|---|---|
| *H04M 11/04* | (2006.01) | |
| *H04W 4/22* | (2009.01) | |
| *H04B 1/3827* | (2015.01) | |
| *B60R 25/24* | (2013.01) | |
| *H04W 4/02* | (2009.01) | |
| *H04W 4/04* | (2009.01) | |

(52) U.S. Cl.
CPC ............... *H04W 4/22* (2013.01); *B60R 25/24* (2013.01); *H04B 1/385* (2013.01); *H04B 2001/3866* (2013.01); *H04W 4/023* (2013.01); *H04W 4/046* (2013.01)

(58) Field of Classification Search
CPC ....... H04W 4/22; H04W 4/023; H04W 4/046; H04B 1/385; H04B 2001/3866; B60R 25/24
USPC ......... 455/404.2, 404.1, 414.1, 456.1, 569.2, 455/550.1
See application file for complete search history.

(56) References Cited

U.S. PATENT DOCUMENTS

| | | | | |
|---|---|---|---|---|
| 9,399,398 | B1 * | 7/2016 | Logan | B60L 3/08 |
| 9,550,418 | B1 * | 1/2017 | Logan | B60K 28/10 |
| 2004/0097329 | A1 * | 5/2004 | Chang | B60K 28/10 477/99 |
| 2011/0053605 | A1 * | 3/2011 | Carpio | G01S 5/0027 455/456.1 |
| 2012/0028680 | A1 * | 2/2012 | Breed | B60C 11/24 455/556.1 |
| 2013/0041525 | A1 * | 2/2013 | Tomberlin | B60R 21/015 701/2 |
| 2013/0086722 | A1 * | 4/2013 | Teetzel | F41H 1/04 2/2.5 |
| 2015/0192993 | A1 * | 7/2015 | Pellaton | G06F 3/014 340/10.5 |

(Continued)

*Primary Examiner* — Khai M Nguyen
(74) *Attorney, Agent, or Firm* — Hayes Soloway PC

(57) ABSTRACT

There is provided a system for enhancing safety of a vehicle for which an operator wears a helmet, the system comprising an RFID device comprising an RFID tag and an RFID reader adapted to detect whether the helmet is within a proximity distance from the vehicle and to output a first helmet status signal; a helmet presence detector adapted to detect whether the helmet is being worn by the operator and to output a second helmet status signal; and a circuit for receiving safety conditions signals comprising the first and second helmet status signals and for activating an ignition system of the vehicle when safety conditions are detected, the safety conditions comprising when the helmet is detected to be concurrently within the proximity distance and worn by the operator. There is also provided a safety circuit and helmet device.

18 Claims, 10 Drawing Sheets

(56) References Cited

U.S. PATENT DOCUMENTS

2016/0144773 A1* 5/2016 Alataas ................ B60Q 1/2676
340/475
2016/0292520 A1* 10/2016 Takahashi .......... G06K 9/00335

* cited by examiner

SAFETY HELMET AND VEHICLE SYSTEM, CIRCUIT AND DEVICE

FIELD OF THE DISCLOSURE

The invention relates to safety systems of vehicles for which the operator is required to wear a helmet, and more particularly to system, device and circuit for enhancing security of a vehicle and an operator for which a safety helmet is required to be worn.

BACKGROUND OF THE DISCLOSURE

Safety in bikes and other vehicles for which an operator is required to wear a helmet is very limited due to the lack of guards and poles that would take the impact in case an accident occurred. However there are some protection outfit that can be worn to protect the biker in such scenarios. Examples are helmets, jackets, pants, and boots that are designed for the purpose of protection. Although the methods mentioned above can work effectively to reduce the impact of an accident; the rider is not forced to wear them. Not wearing the safety protection outfits is the cause of severe injury in nowadays bikes accidents.

Some traditional systems proposed use of a sensor at the helmet to detect whether it is being worn by the biker for activating a bike ignition system, however these have limitations as they are not adapted to detect effectively if the biker is close or far from the bike, so while they may ensure that the helmet is being used to activate ignition of the vehicle, they would compromise the security of the bike if the biker is still far away from his/her bike. In addition, the prior art failed to take into considerations other safety and security criteria for controlling the ignition of the vehicle.

Besides, if the biker makes an accident, the biker will have limited chances or options to report to authorities for medical assistance. If the biker loses conscious, then, he cannot make a call and he has to be lucky to rely on people in proximity of the accident for assistance. Also, the prior art failed to provide solutions on how to assess a serious accident and report accidents to authorities for help.

SUMMARY

Accordingly, there is a need for a system and device for sustain load measurement which overcomes the above mentioned drawbacks and other limitations of traditional systems.

As a first aspect of the invention, there is provided a system for enhancing safety of a vehicle for which an operator wears a helmet, the system comprising:
- an RFID device comprising an RFID tag and an RFID reader adapted to detect whether the helmet is within a proximity distance from the vehicle and to output a first helmet status signal;
- a helmet presence detector adapted to detect whether the helmet is being worn by the operator and to output a second helmet status signal;
- a circuit for receiving safety conditions signals comprising the first and second helmet status signals and for activating an ignition system of the vehicle when safety conditions are detected, the safety conditions comprising when the helmet is detected to be concurrently within the proximity distance and worn by the operator.

Preferably, the RFID tag and the helmet presence detector are adapted to be positioned at the helmet, and wherein the RFID reader is adapted to be positioned at the vehicle.

Preferably, the circuit comprises:
- a transmitter adapted to be positioned at the helmet and connected to the helmet presence detector;
- a receiver adapted to positioned at the vehicle and to be in wireless communication with the transmitter;
- a processing unit adapted to be positioned at the vehicle and to be in communication with the receiver, the RFID reader and with the ignition system;
- wherein the transmitter receives from the helmet detector and wirelessly transmits to the receiver the second helmet status signal, wherein the processing unit receives the first and second helmet status signals respectively from the RFID reader and from the receiver and determines based on the signals received whether the helmet is concurrently within the proximity distance and worn by the operator and if it is the case, outputs an activation signal for activating the vehicle ignition system.

Preferably, the proximity distance is set as a function of a location of the RFID reader when positioned at the vehicle such that the helmet is detected by the reader only when the operator is sufficiently close to the vehicle or seated within the vehicle.

Preferably, the RFID tag and the RFID reader frequency and power are configured to set the proximity distance.

In case where the vehicle is a motorcycle, the proximity distance can be set in the range of 0.5-1.5 meter, the tag frequency can be set in the range of 3-30 MHz and the reader power can be set in the range of 10-20 Watts.

Preferably, the helmet presence detector comprises one or more pressure sensors, optical sensors, thermal sensors or biophysical sensors.

Preferably, the system further comprises an operator seat detector adapted to detect whether the operator is seated on an operator seat of the vehicle and to output a seat status signal, and wherein the safety conditions signals received by the circuit comprises the seat status signal, and wherein the safety conditions based on which the ignition system is activated when detected further comprise when the operator is detected to be seated on the vehicle seat.

Preferably, the system further comprises:
- an accident detector for detecting occurrence of an accident and outputting an accident status signal; and
- an emergency notification unit adapted to take an emergency action based on instructions received from the circuit;
  - wherein the circuit is adapted to receive the accident status signal and to activate the emergency notification unit when serious accident conditions are detected, the serious accident conditions comprising when the operator is not detected on the operator seat at the occurrence of an accident based on the seat status signal and the accident status signal received respectively from the vehicle seat detector and the accident detector.

Preferably, the emergency notification unit comprises:
- a GSM/GPS system adapted to establish a voice communication channel with a predefined third party and to provide the third party with a location of the vehicle where the accident occurred;
- a speaker/microphone device adapted to be automatically activated when the voice communication channel is established for enabling the operator to communicate with the third party.
  - wherein the activation of the emergency notification unit by the circuit comprises activating the GSM/GPS system for establishing the voice communication channel and sending the accident location and activating the speaker/microphone for enabling communication with the operator through the voice communication channel.

Preferably, the system further comprises:

a speed detector for detecting a wheel speed of the vehicle and outputting a wheel speed signal;

wherein the circuit is adapted to receive the wheel speed signal and wherein the serious accident conditions based on which the emergency notification unit is activated by the circuit when detected further comprise when the wheel speed of the vehicle is detected to be higher than a predefined threshold at the occurrence of an accident.

Preferably, the circuit is adapted to lock the ignition system for a predefined period of time when the serious accident conditions are detected.

Preferably:

the operator seat detector comprises one or more pressure sensors, optical sensors or thermal sensors adapted to change electrical condition when the operator is seated on the seat;

the accident detector comprises one or more shock detectors; and the wheel speed detector comprises one or more speed sensors adapted to measure the rotational speed of one or more vehicle wheels.

Preferably, the circuit comprises a microcontroller or microprocessor adapted to:

receive real time detection signals from the RFID reader, the helmet presence detector, the speed detector, the accident detector and the operator seat detector;

assess if the safety conditions are met as a function of the real time detection signals received;

assess if the serious accident conditions are met as a function of the real time detection signals received; and activate or deactivate the ignition system and the emergency notification unit as a function of the assessments.

The vehicle can be a motorcycle, a bike, a personal water craft, a snowmobile or any other type of vehicle for which the operator wears a helmet.

As another aspect of the invention, there is provided a safety helmet adapted to be worn by an operator of a vehicle for enhancing safety, the helmet comprising:

an RFID tag adapted to be connected to a RFID reader, the reader being adapted to be positioned at the vehicle for detecting whether the helmet is within a proximity distance and to output a first helmet status signal;

a helmet presence detector adapted to be connected to a circuit via a wireless transmitter for detecting whether the helmet is being worn by the vehicle operator and to output a second helmet status signal;

wherein the circuit is adapted to be positioned at the vehicle and to be connected to an ignition system of the vehicle for receiving the first and second helmet status signals and for activating the ignition system of the vehicle when the helmet is detected to be concurrently within the proximity distance and worn by the operator.

As a further aspect of the invention, there is provided a safety circuit adapted to be positioned at a vehicle and to be connected to an RFID reader in communication with an RFID tag positioned at a helmet, a helmet presence detector positioned at the helmet, and at least one of a speed detector adapted to detect a wheel speed of the vehicle, an accident detector adapted to detect occurrence of an accident and an operator seat detector adapted to detect whether a vehicle operator is seated on a vehicle operator seat for:

receiving real time detection signals from the RFID reader, the helmet presence detector, and the at least one of the speed detector, the accident detector and the operator seat detector;

assessing if safety conditions are met as a function of the real time detection signals received;

assessing if serious accident conditions are met as a function of the real time detection signals received; and activating or deactivating at least one of a vehicle ignition system and an emergency notification unit as a function of the assessments.

Preferably, the safety conditions comprise whether the helmet is detected to be concurrently within the proximity distance and worn by the operator.

Preferably, the safety conditions further comprise whether the operator is detected to be seated on the vehicle operator seat.

Preferably, the serious accident conditions comprise at least one of whether the operator is not detected to be on the operator seat at the occurrence of an accident, and whether the wheel speed is above a predefined threshold while the operator is not detected to be on the operator seat at the occurrence of an accident.

Preferably, the circuit comprises a microcontroller comprising a processing unit and an input/output interface adapted to receive the detection signals, process the detection signals for conducting the assessments, and to activate or deactivate the at least one of the ignition system and the emergency notification unit based on a decision made by the processing unit as a function of the assessments.

DESCRIPTION OF THE DRAWINGS

The advantages and features of the present invention will become better understood with reference to the following detailed description taken in conjunction with the accompanying drawings, in which.

Like reference numerals refer to like parts throughout the description of several views of the drawing.

DESCRIPTION OF THE INVENTION

The exemplary embodiments described herein detail for illustrative purposes are subjected to many variations.

Figure 1:
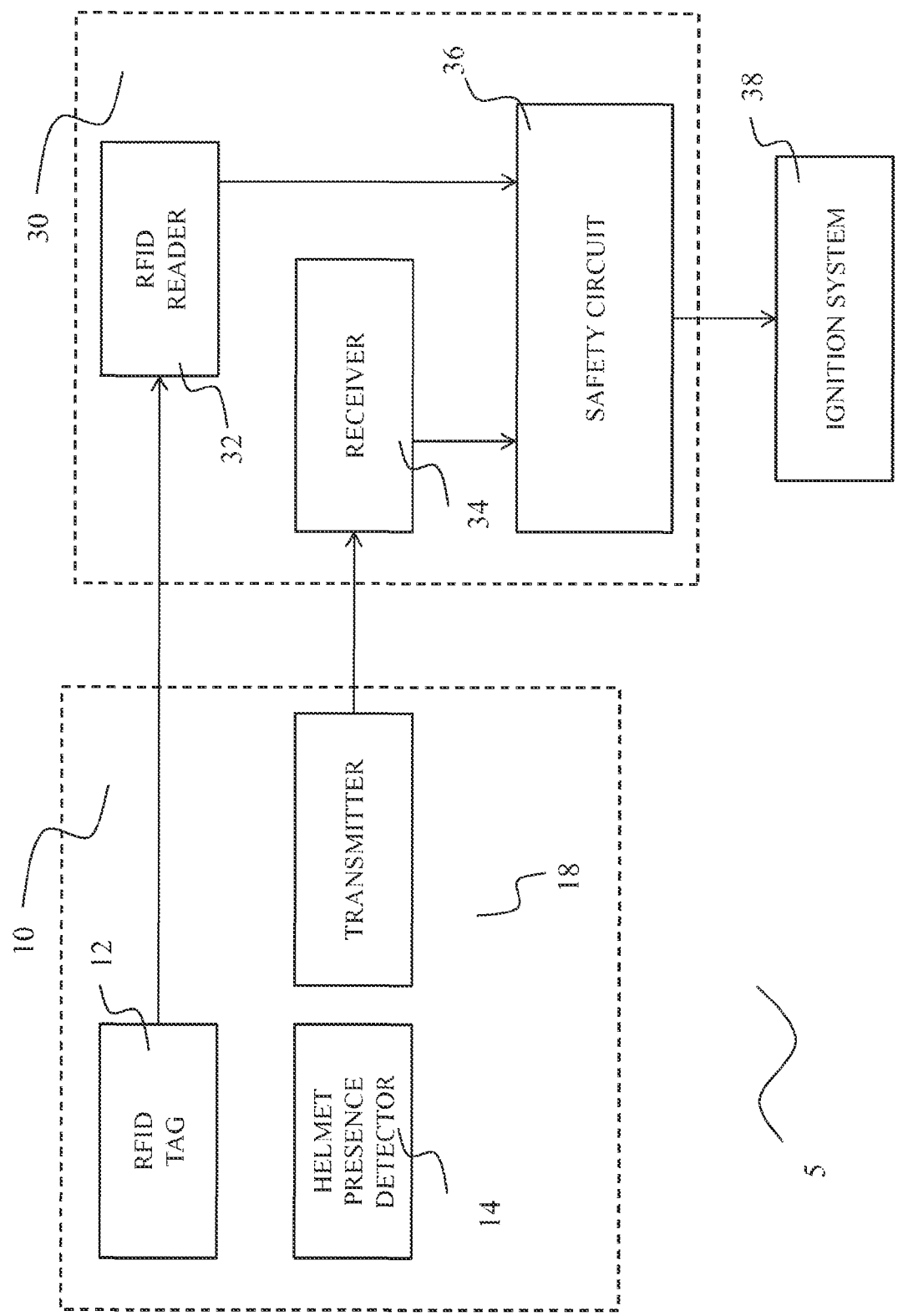
FIG. 1 illustrates a system for enhancing safety of a vehicle for which an operator wears a helmet according to an embodiment of the present invention.

As illustrated in FIG. 1, there is provided a system 5 for enhancing safety of a vehicle for which an operator wears a helmet. The system 5 comprises an RFID tag 12, an RFID reader 32, a helmet presence detector 14, a transmitter 18, a receiver 34, and a safety circuit 36 adapted to be connected to an ignition system 38 of the vehicle.

The safety circuit 36 is an electronic circuit. In an embodiment of the invention, the safety circuit 36 comprises a microcontroller comprising a processing unit and an input/output interface adapted to receive, process and and transmit signals. The safety circuit can however be configured using various electronic components suitable to carry out the functions discussed herein.

In an embodiment of the invention, the RFID tag 12, the helmet presence detector 14 and the transmitter 18 form a helmet device component 10 adapted to be mounted on a helmet. The RFID reader 32, the receiver 34, and the safety circuit 36 form a vehicle device component 30 adapted to be mounted on a vehicle.

The RFID tag 12 is adapted to be detected by the RFID reader 32 when the RFID tag 12 is within a detection distance (also called a proximity distance or a safety distance) from the RFID reader 32. The frequency of the RFID tag 12 and the power of the RFID reader 32 are configured as a function of the proximity distance desired. When the helmet is within the proximity distance of the vehicle, the RFID reader 32 will detect the presence of the RFID tag 12 and will send a first helmet status signal to the safety circuit 36 with an indication of the detection of the helmet within the proximity distance from the vehicle.

The detection distance is preferably set as a function of the distance range between the RFID reader 32 and the RFID tag 12 when the vehicle operator is seated inside the vehicle or is located sufficiently close (in proximity) of the vehicle. The detection distance must not be too big in order to be able to conclude with a sufficiently high level of likelihood that the operator is effectively seated inside the vehicle (or in proximity of the vehicle) when the helmet is detected.

This proximity distance however varies based on the type of the vehicle which defines physical dimensions and configuration, as well as on the location where the RFID tag 12 is positioned at the helmet side as well as on the location where the RFID reader 32 is positioned at the vehicle side. This being said, there is a direct relationship between the proximity distance to be set and the the vehicle type (including physical dimensions and configuration) and/or the exact mounting configuration of the RFID tag 12 and RFID reader 32 at the helmet and vehicle sides respectively. The proximity distance and mounting configuration of these components should be set in such a manner that the RFID reader 32 can only detect the RFID tag 12 within a safety proximity distance within which the operator is likely to be seated within the vehicle or sufficiently in proximity thereof. The RFID tag can be a passive RFID tag 12.

Assuming in an implementation example where the vehicle is a motorcycle, the distance between the helmet when worn by a seated motorcycle operator (biker) and the portions of the motorcycle where the RFID reader 32 can usually be mounted is normally in the range of 0.5-1.5 meters. This is normally the proximity safety distance within which it is likely that the operator is being seated in the motorcycle. In this case, the RFID tag 12 and RFID reader 32 should be carefully selected and/or configured in order to enable a detection distance only in this range. In this example, in order to enable detection within this safety distance only, the frequency of the RFID tag 12 should be in the high frequency range between 3-30 MHz and the RFID reader power should be in the range of 10-20 Watts. These frequency and power parameters would normally allow RFID detection in a 0.5-1.5 meter range.

The helmet presence detector 14 is adapted to detect whether the helmet is effectively being worn by the biker. In an embodiment of the invention, the helmet presence detector 14 comprises a push button adapted to be placed within the internal portion of the helmet and to be engaged/forced/pushed by the head of the biker when the helmet is worn. The push button is adapted to be connected to an electrical switch adapted to change electrical condition when the push button is being engaged. According to this embodiment, when the helmet is being worn, the head of the biker engages/forces in the push button leading to a change in an electrical status of the electrical switch. The change of electrical status of the switch is interpreted as a signal indicative of a detection of a helmet. In another embodiment of the invention, the helmet presence detector 14 comprises one or more sensors adapted to detect whether the helmet is effectively being worn. The one or more sensors comprise at least one of a pressure sensor, an optical sensor, thermal sensor and a biophysical sensor.

The helmet presence detector 14 outputs a second helmet status signal and is connected to the transmitter 18 which receives the first helmet status signal indicating whether the helmet is being worn by the operator. The transmitter 18 (at the helmet side) is adapted to be in wireless communication with the receiver 34 (at the vehicleside) for signalling thereto the worn status of the helmet. The transmitter 18 is preferably a radio frequency (RF) transmitter having an RF antenna and the receiver 34 is preferably a RF receiver having an RF antenna where communication between the RF transmitter and the RF receiver is conducted through a RF electrical signal. At the vehicle side, the receiver 34 is adapted to be connected to the safety circuit 36 for transmitting thereto the second helmet status signal indicating whether the helmet is being worn by the operator. The safety circuit 36 is adapted to receive the second helmet status signal from the receiver 34.

The safety circuit 36 is therefore adapted to receive the first helmet status signal (proximity signal) from the RFID reader 32 when the helmet is detected within the detection distance from the vehicle, and the second helmet status signal (indication of whether the helmet is being worn by the operator) from the RF receiver 34 when the helmet is effectively being worn by the operator. The safety circuit 36 is adapted to be connected to the ignition system 38 of the vehicle for sending thereto an ignition activation signal only if the first and second helmet signals are indicative that both the helmet is within the proximity distance from the vehicle and that the helmet is effectively being worn by the operator concurrently at the same time.

Figure 2:
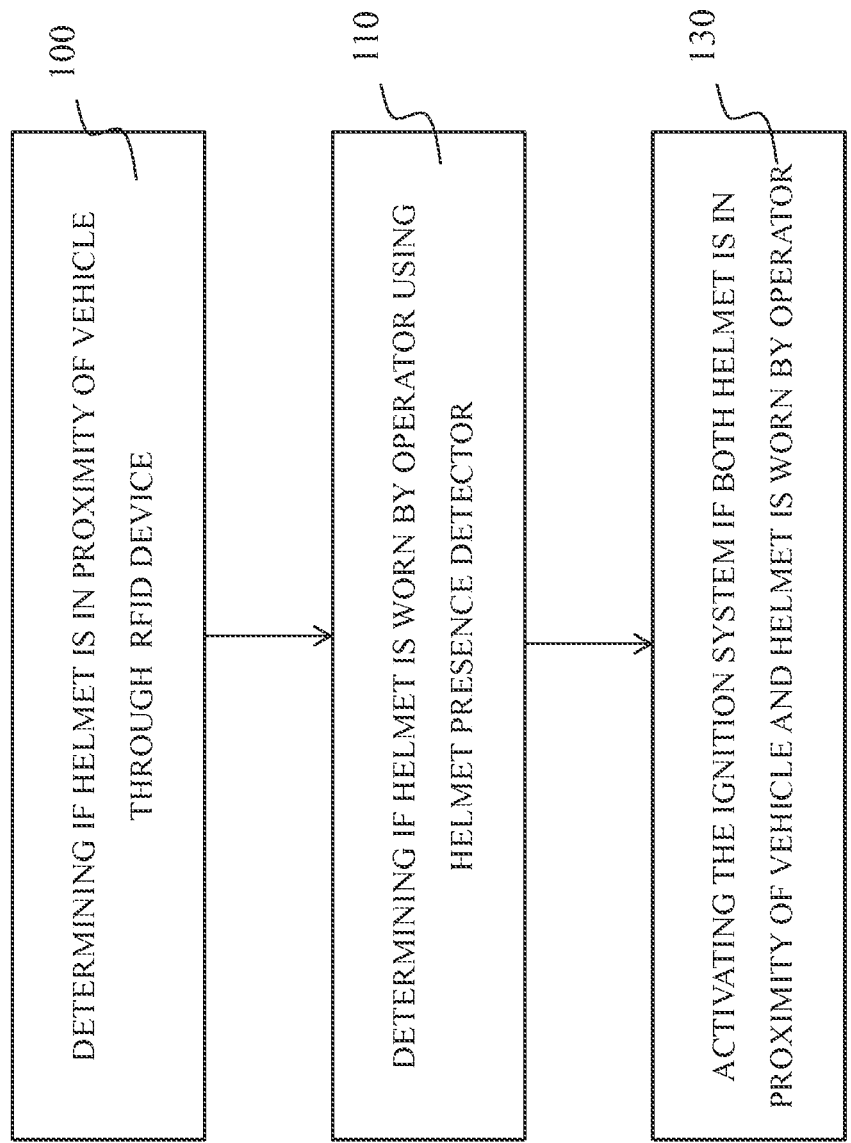
FIG. 2 illustrates an ignition activation process conducted by the safety circuit of the system according to an embodiment of the present invention.

FIG. 2 illustrates the process executed by the safety circuit 36 which is to determine if the helmet is in proximity of the vehicle as detected by the RFID reader (100), to determine if the helmet is worn by the operator as detected by the helmet presence detector (110), and to activate the ignition system only if both the helmet is determined to be in proximity of the vehicle and the helmet is determined to be worn by the biker (130) concurrently at the same time.

In this sense, as the presence of the helmet within the detection distance is not conclusive in itself that the operator is effectively wearing the helmet, the safety circuit 36 is configured not to activate the ignition system 38 based only on this information for operator safety reasons. Also, as the worn status of the helmet is not indicative by itself that the operator is in proximity of the vehicle, the safety circuit 36 is adapted not to activate the ignition system 38 based only on this information for security reasons. For example, if the operator is 100 meters away from the vehicle and wearing the helmet, the safety circuit 36 would still receive a second helmet status signal indicating that the helmet is being worn by the operator while the operator is still far away from the vehicle and any activation of the ignition system 38 can expose the vehicle to theft. Therefore, for both safety of the operator and security of the vehicle, the safety circuit 38 will only activate the ignition system 38 when both the helmet is detected to be worn by the operator and the helmet is detected to be in proximity of the vehicle at a same given time period. The same safety device 5 therefore allows assessing and achieving both security and safety conditions concurrently.

In an embodiment of the invention, the safety device 5 comprises an operator seat detector 70 adapted to detect whether the operator is seated on the vehicle seat. The operator seat detector 70 is preferably a pressure sensor mounted at the vehicle seat and configured to detect presence of the operator when seated on the seat. The vehicle seat detector 70 is adapted to be connected to the safety circuit 36 either using an electrical wire or wirelessly through a transmitter connected to the sensor depending on the specific design of the device 5.

In an embodiment of the invention, the safety circuit 36 is adapted to send an activation signal to activate the ignition system 38 only if the helmet is detected by the RFID reader 32 to be in proximity of the vehicle, if the helmet is detected by the helmet presence detector 14 to be worn by the operator (110), and if the operator is detected by the vehicle seat detector 70 to be seated on the vehicle seat (120).

Figure 3:
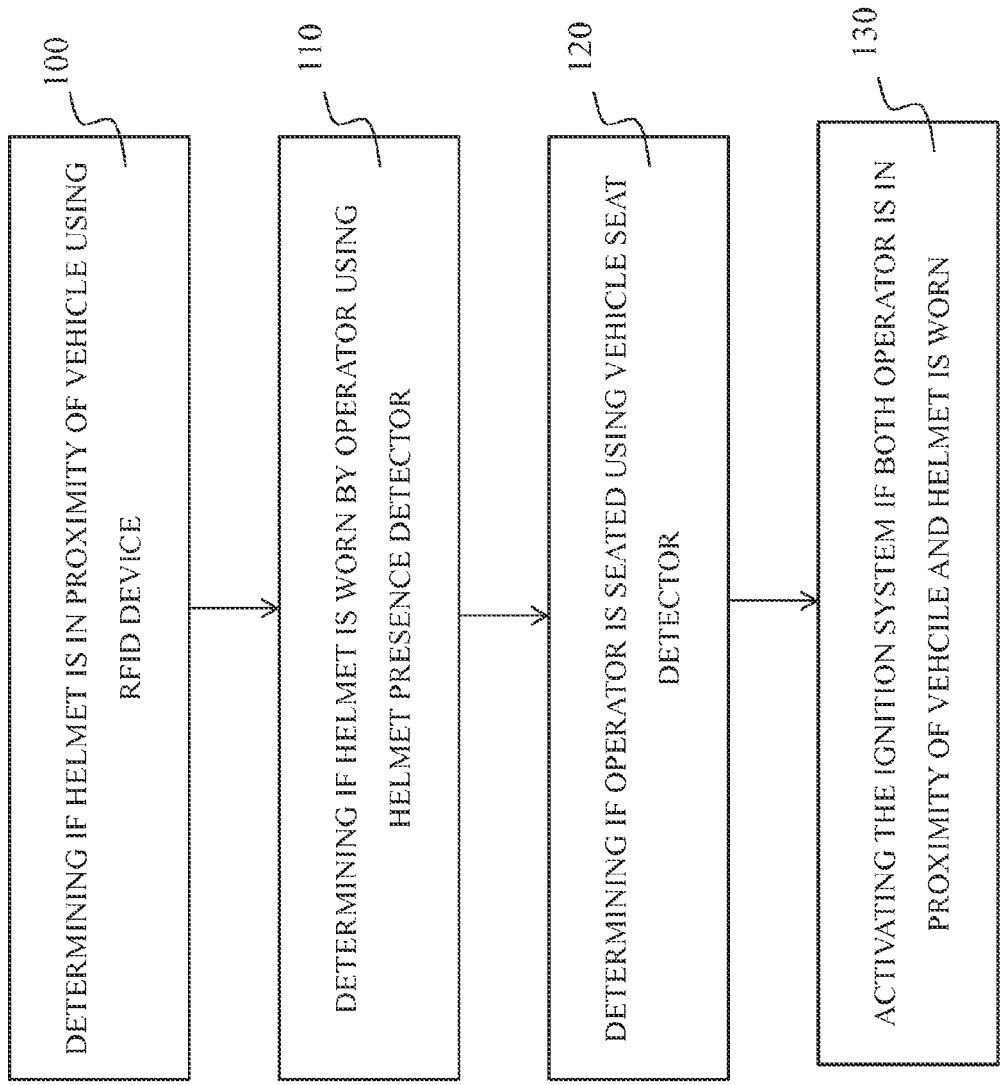
FIG. 3 illustrates an ignition activation process conducted by the safety circuit of the system according to another embodiment of the present invention.

FIG. 3 illustrates the process executed by the safety circuit 36 which is to determine if the helmet is detected by the RFID reader to be in proximity of the vehicle(100), to determine if the helmet is detected by the helmet presence detector to be worn by the operator (110), to determine if the operator is detected by the vehicle seat detector to be seated on the vehicle(120) and to activate the ignition system if the three previous steps 100, 110 & 120 are determined to be true (130).

Figure 4:
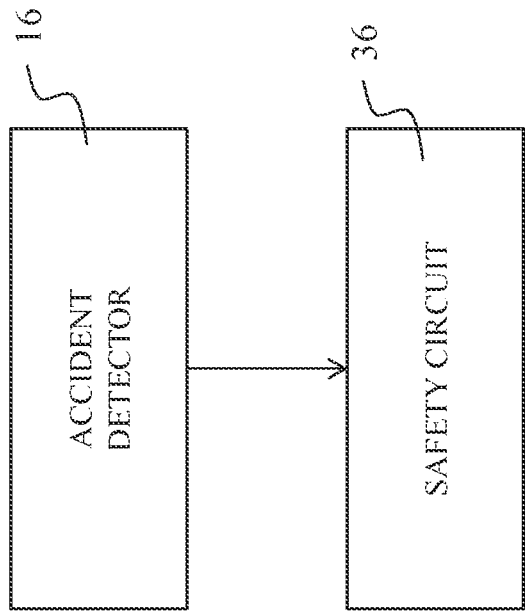
FIG. 4 illustrates an accident detector in connection with the safety circuit of the system according to an embodiment of the present invention.

In an embodiment of the invention, as illustrated in FIG. 4, the device 5 further comprises an accident detector 16 adapted to detect occurrence of an accident. In an embodiment of the invention, the accident detector comprises a shock detector adapted to detect the occurrence of a shock. The shock detector can comprise one or more accelerometers, gyroscopes, pressure sensors or any other suitable sensors adapted to detect occurrence of an accident. In an embodiment of the invention, the accident detector 16 is located at the helmet component 10 of the system 5 mounted within the helmet itself. In this case, the accident detector 16 is adapted to be connected to the transmitter 18 which is adapted to send a signal to the safety circuit 36 with an indication of the occurrence of an accident. In another embodiment of the invention, the accident detector 16 is located at the vehicle component 30 of the system 5 where in this case, the accident detector 16 is directly connected to the safety circuit 36.

Figure 5:
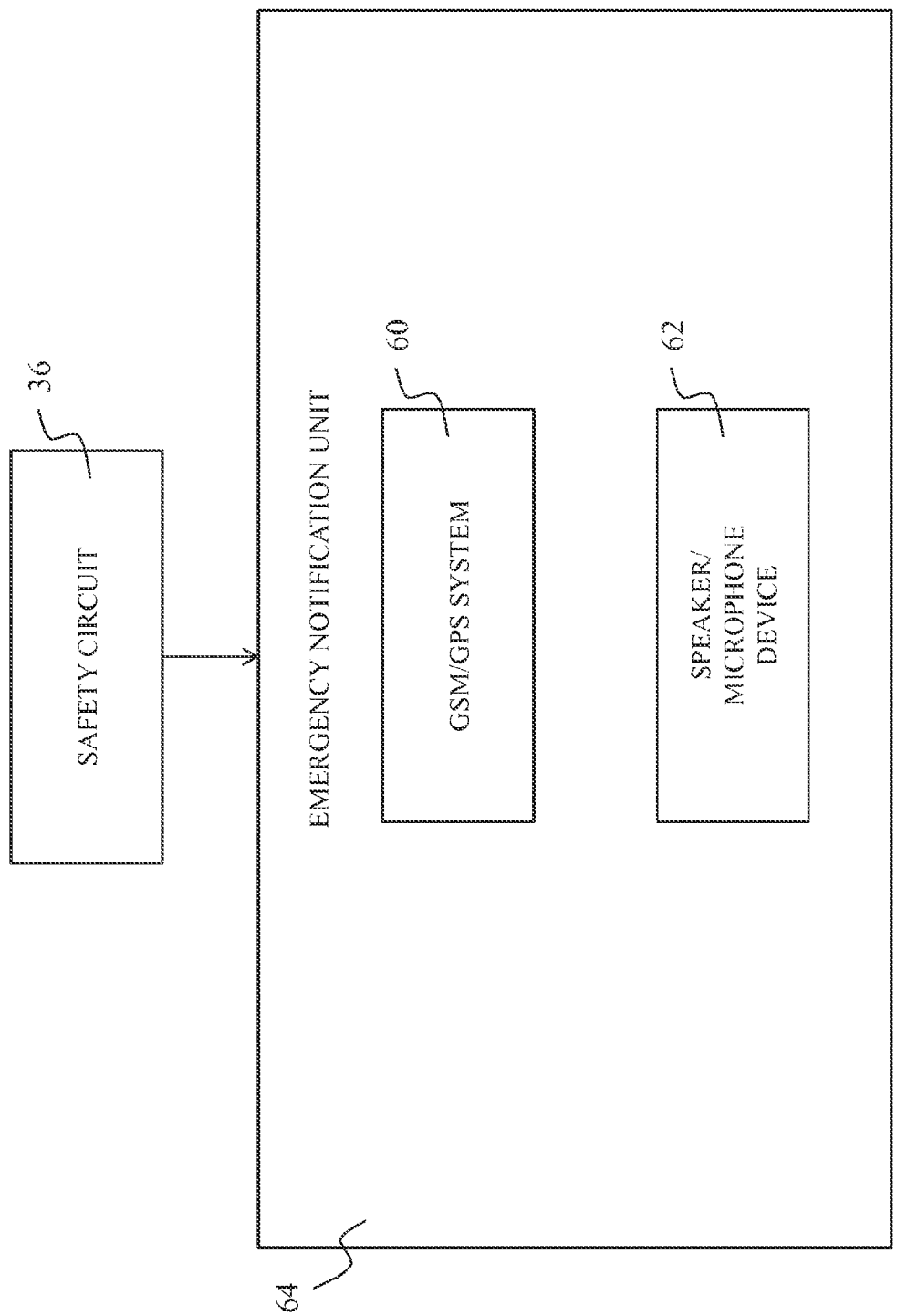
FIG. 5 illustrates an emergency notification unit in connection with the safety circuit of the system according to an embodiment of the present invention.

In an embodiment of the invention, as illustrated in FIG. 5, the vehicle component 10 of the system 5 further comprises an emergency notification unit 64 adapted to be connected to the safety circuit 36. The emergency notification unit 64 is adapted to automatically establish a communication channel with a third party for emergency assistance upon receipt of a signal to this effect from the safety circuit 36.

In an embodiment of the invention, the emergency notification unit comprises a GSM/GPS emergency reporting system 60 comprising a SIM card configured to establish a communication with the third party for emergency assistance. The GSM/GPS emergency reporting system 60 is also adapted to send the location of the vehicle at the occurrence of the accident to the third party. The GSM/GPS emergency reporting system is preferably located at the vehicle component 30 of the system 5. The communication established with the third party can be a text message, a voice message or a voice call.

In an embodiment of the invention, the emergency notification unit 64 further comprises a speaker/microphone device 62 adapted to be connected to the GSM/GPS emergency reporting system which is activated upon establishment of a voice communication with the third party for enabling real time communication between the operator and the third party. The speaker/microphone device 62 is preferably located at the helmet component 10 for enabling the operator to communicate with the third party in case he/she falls away from the vehicle by the occurrence of the accident. The third party can be a private or public person or entity such as the police or a medical assistance entity for example. The activation of the speaker/microphone device 62 can be conducted by the safety circuit 36 or alternatively by the emergency notification unit 64.

In an embodiment of the invention, the safety circuit 36 activates the emergency notification unit 64 which communicates with the third party emergency party upon receipt of a signal from the accident detector 16 of an occurrence of an accident. In another embodiment of the invention, an indication of an occurrence of an accident by the accident detector 16 is not indicative per se of the gravity of the accident and further information is processed by the safety circuit 36 before a decision is taken as to whether or not to activate the emergency notification unit 64 a explained hereinafter.

Figure 6:
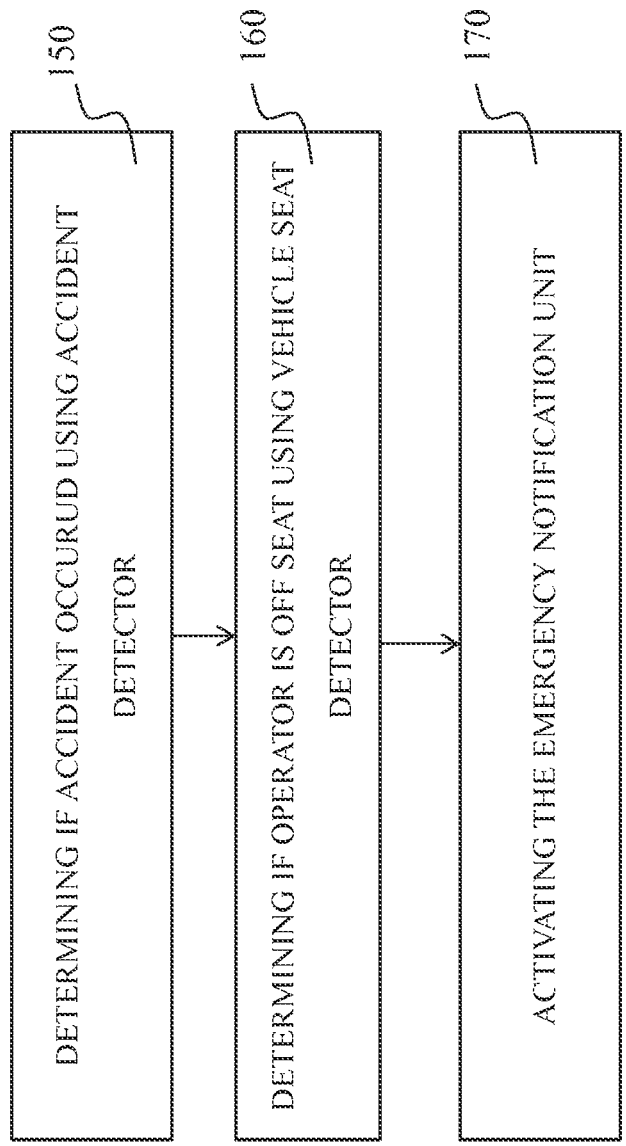
FIG. 6 illustrates a process executed by the safety circuit for activating the emergency notification unit according to an embodiment of the present invention.

In an embodiment of the invention, as illustrated in FIG. 6, the safety circuit 36 determines if an accident occurred through the information received from the accident detector (150) and determines if the operator is off the vehicle seat through the information received from the vehicle seat detector (160) and only if it is determined to be true in 150 & 160, the safety circuit activates the emergency notification unit (170).

Figure 7:
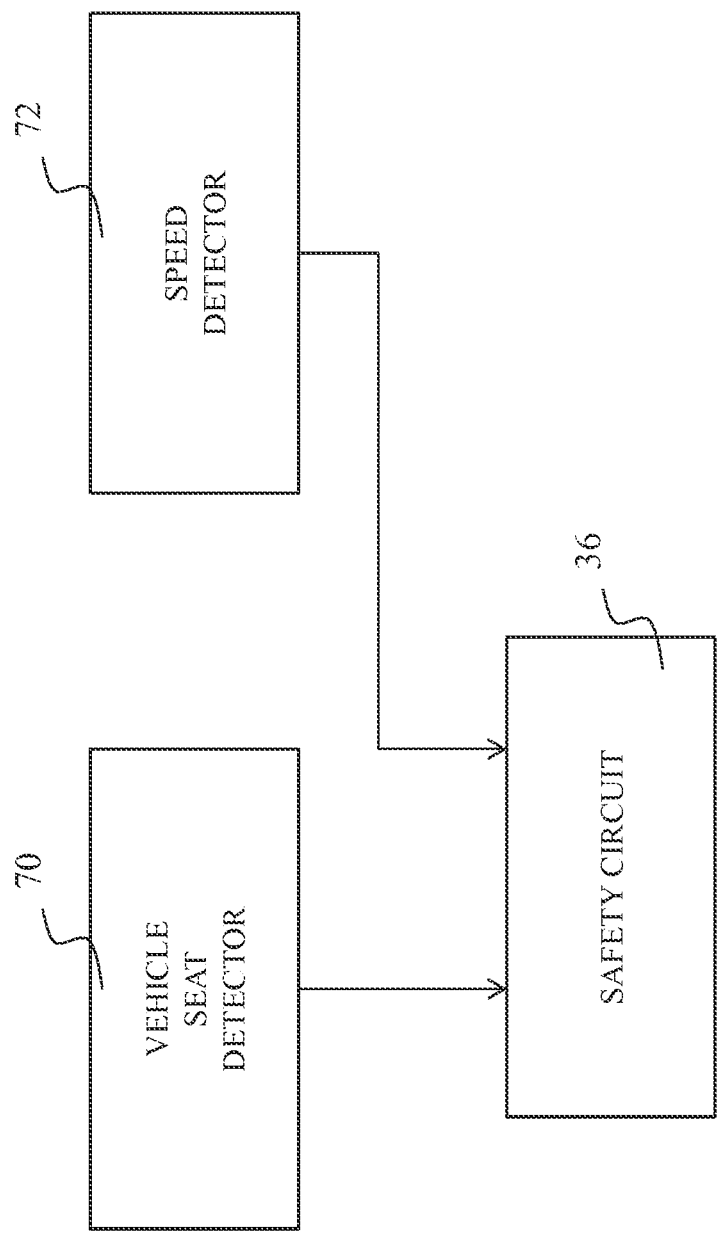
FIG. 7 illustrates a vehicle seat detector and a speed detector in communication with the safety circuit of the system according to an embodiment of the present invention.

In an embodiment of the invention, as illustrated in FIG. 7, the safety system 5 further comprises a speed detector 72 adapted to be connected with the safety circuit 36. The speed detector 72 is adapted to detect the rotational speed of the vehicle wheels. In an embodiment of the invention, the safety circuit 36 is adapted to process the signals received from the vehicle seat detector 70 and the speed detector 72 to determine occurrence of an accident. The safety circuit 36 is adapted to determine occurrence of an accident when the speed detector 70 reports that the vehicle is still running while the vehicle seat detector 70 indicates that the operator is no longer seated on the vehicle seat.

In fact, when a vehicle accident occurs on a motorcycle, normally the operator falls from the vehicle while the wheels of the motorcycle remain running for a certain period of time after occurrence of the accident. If the vehicle wheels are running while the operator is no longer seated on the vehicle seat, this is a strong indication that the operator fell off the vehicle during a ride and the occurrence of a serious accident. The readings of both the speed detector 72 and the vehicle seat detector 70 are used by the safety circuit 36 to determine occurrence of this kind of accident. In case a determination is made by the safety circuit 36 as to the occurrence of a serious accident, the safety circuit 36 activates the emergency notification unit 64.

Figure 8:
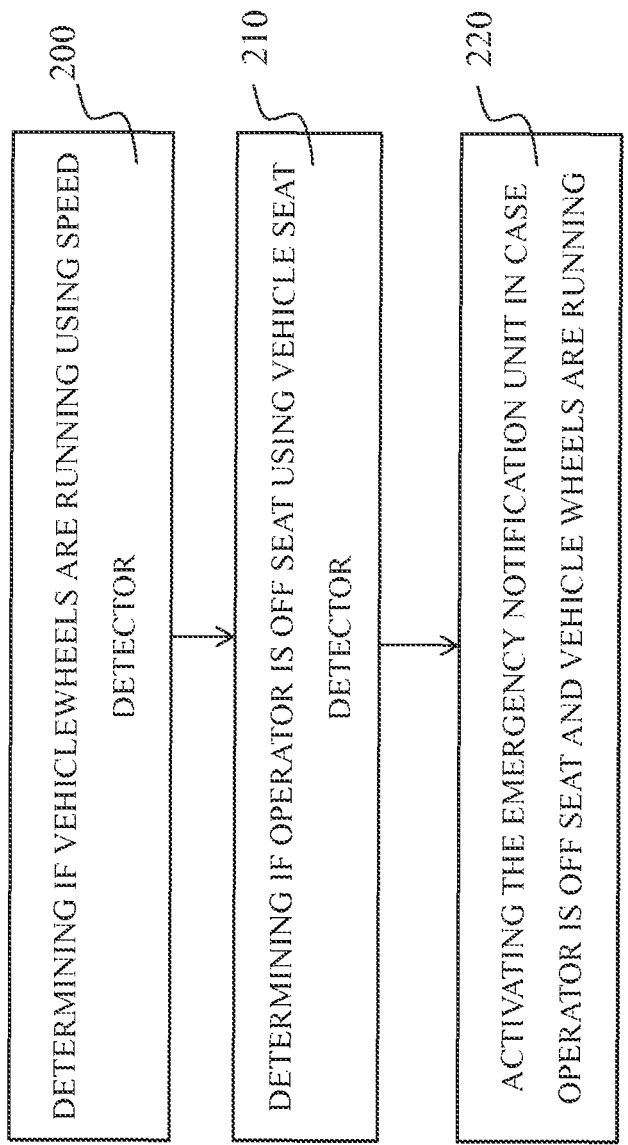
FIG. 8 illustrates a process executed by the safety circuit for activating the emergency notification unit according to another embodiment of the present invention.

As illustrated in FIG. 8, the process conducted by the safety circuit 36 is to determine if the vehicle wheels are running by reading the speed detector (200), to determine if the operator is off the vehicle seat through information received from the vehicle seat detector (210), and to activate the emergency notification unit for communicating with the third party for assistance in case the operator is determined to be off the vehicle seat while the vehicle wheels are running (220). The steps 200 and 210 can be carried out in any order.

Figure 9:
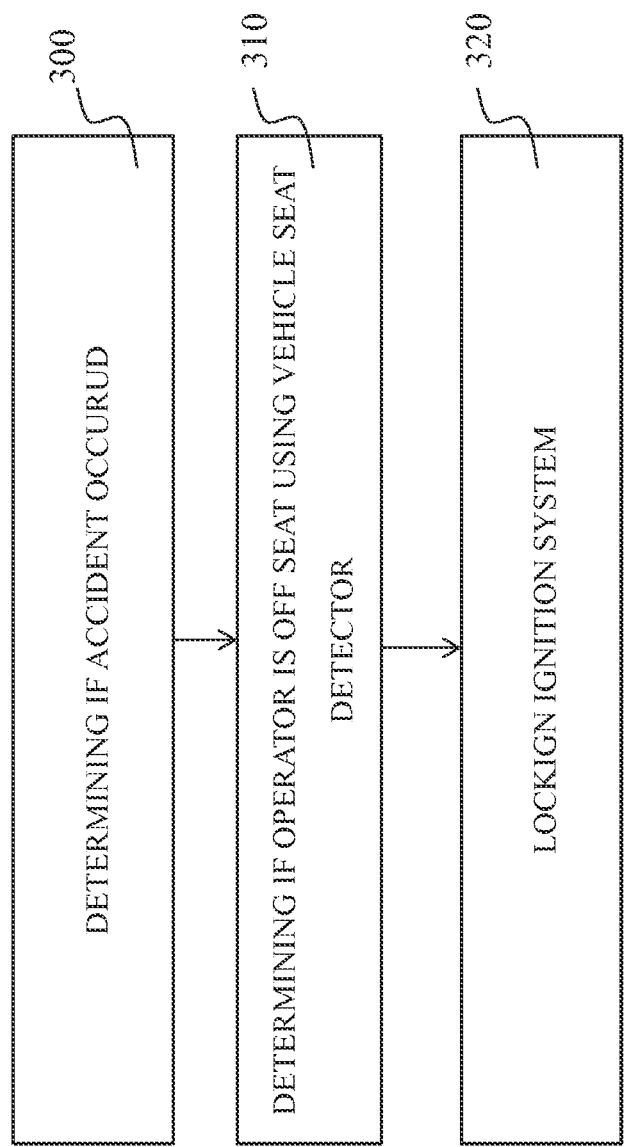
FIG. 9 illustrates a process executed by the safety circuit for locking the ignition system of the vehicle according to an embodiment of the present invention.

The safety system 5 is further adapted to undertake an additional security measure in case of an occurrence of an accident. In an embodiment of the invention, as illustrated in FIG. 9, the safety circuit 36 is adapted to determine if an accident occurred (300) and to determine if the operator is off the vehicle seat using information received from the vehicle seat detector (310) and to deactivate the ignition system in case where both steps 300 & 310 are determined to be true. The determination of an accident is conducted according to any one of the embodiments discussed above. This is a security measure to avoid the theft of the vehicle in case where the operator remains in proximity of the vehicle within the RFID detection distance after the accident. This is as the operator can be unconscious at the occurrence of the accident.

The safety system 5 is further adapted to determine the gravity of an accident based on various criteria. The gravity of the accident as determined by the system 5 can be used by the safety circuit 36 for several reasons. For example, the safety circuit 36 may generate and send to the emergency notification unit 64 an indication of the gravity level of the accident which is transmitted thereby to the third party. The third party may then decide to take different kind of actions based on the gravity level. The safety circuit 36 may also be configured to activate the emergency notification unit 64 only if the gravity of the accident is determined to be higher than a certain preconfigured threshold.

Figure 10:
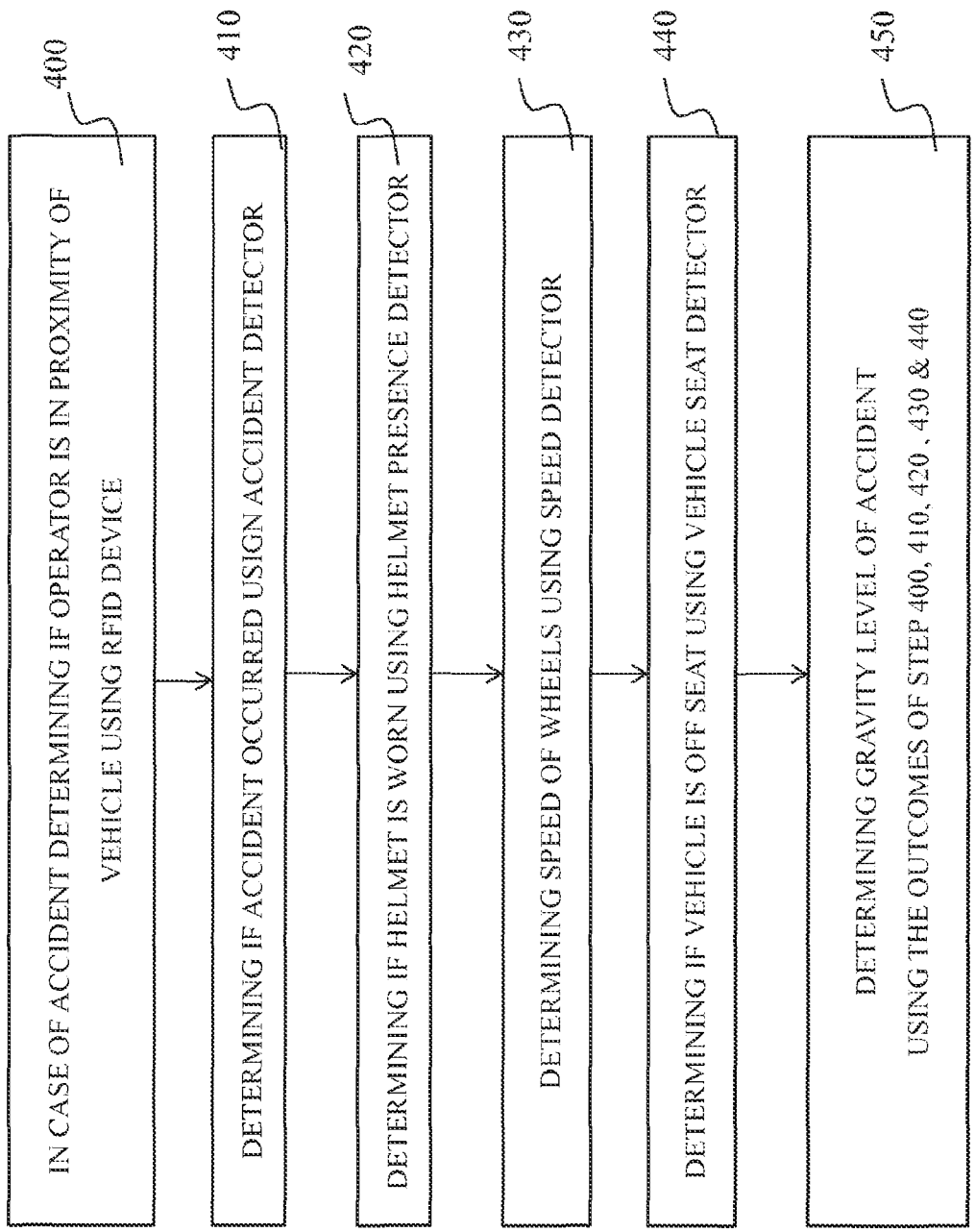
FIG. 10 illustrates a process executed by the safety circuit for assessing a gravity level of an accident according to an embodiment of the present invention.

FIG. 10 illustrates the process executed by the safety circuit 36 to determine the gravity level of an accident. The safety circuit determines if the operator is in proximity of the vehicle through the RFID tag—RFID reader (400), determines if the accident detector has been activated (410), determines if the helmet is being worn by the operator (420), determine the speed of the wheels through the speed detector (430), determines if the operator is off seat through the information received from the vehicle seat detector (440), and then processes the outcomes of steps 400 to 440 for determining a level of gravity of the accident (450).

A vehicle should be interpreted to mean any type of vehicle requiring the operator to wear a helmet, including but not limited to motorcycles, snowmobiles, boats, personal watercrafts and the like.

The invention claimed is:

1. A system for enhancing safety of a vehicle for which an operator wears a helmet, the system comprising:
    an RFID device comprising an RFID tag and an RFID reader for detecting whether the helmet is within a proximity distance from the vehicle and for outputting a first helmet status signal;
    a helmet presence detector, comprising one or more sensors for detecting whether the helmet is being worn by the operator and to output a second helmet status signal;
    a circuit for receiving safety conditions signals comprising the first and second helmet status signals and for activating an ignition system of the vehicle when safety conditions are detected, the safety conditions comprising when the helmet is detected to be concurrently within the proximity distance and worn by the operator; and
    wherein the safety conditions signals received by the circuit comprise the seat status signal, and wherein the safety conditions based on which the ignition system is activated when detected further comprise when the operator is detected to be seated on the vehicle seat.

2. The system as claimed in claim 1, wherein the RFID tag and the helmet presence detector are positioned at the helmet, and wherein the RFID reader is positioned at the vehicle.

3. The system as claimed in claim 2, wherein the circuit comprises:
    a transmitter positioned at the helmet and connected to the helmet presence detector;
    a receiver positioned at the vehicle and in wireless communication with the transmitter;
    a processing unit positioned at the vehicle and in communication with the receiver, the RFID reader and with the ignition system;
    wherein the transmitter receives from the helmet detector and wirelessly transmits to the receiver the second helmet status signal, wherein the processing unit receives the first and second helmet status signals respectively from the RFID reader and from the receiver and determines based on the signals received when the helmet is concurrently within the proximity distance and worn by the operator and outputs an activation signal for activating the vehicle ignition system.

4. The system as claimed in claim 3, wherein the proximity distance is set as a function of a location of the RFID reader when positioned at the vehicle such that the helmet is detected by the RFID reader only when the operator is sufficiently close to the vehicle or seated within the vehicle.

5. The system as claimed in claim 4, wherein the RFID tag and the RFID reader frequency and power are configured to set the proximity distance.

6. The system as claimed in claim 5, wherein the vehicle is a motorcycle, the proximity distance is set in the range of 0.5-1.5 meter, the RFID tag frequency is set in the range of 3-30 MHz and the reader power is set in the range of 10-20 Watts.

7. The system as claimed in claim 1, wherein the one or more sensors comprise one or more pressure sensors, optical sensors, thermal sensors or biophysical sensors.

8. The system as claimed in claim 1, further comprising an operator seat detector for detecting whether the operator is seated on an operator seat of the vehicle and to output a seat status signal, and wherein the safety conditions signals received by the circuit comprise the seat status signal, and wherein the safety conditions based on which the ignition system is activated when detected further comprise when the operator is detected to be seated on the vehicle seat.

9. The system as claimed in claim 8, further comprising:
an accident detector for detecting occurrence of an accident and outputting an accident status signal; and
an emergency notification unit for taking an emergency action based on instructions received from the circuit;
wherein the circuit is adapted to receive the accident status signal and to activate the emergency notification unit when serious accident conditions are detected, the serious accident conditions comprising when the operator is not detected on the operator seat at the occurrence of an accident based on the seat status signal and the accident status signal received respectively from the vehicle seat detector and the accident detector.

10. The system as claimed in claim 9, wherein the emergency notification unit comprises:
a GSM/GPS system comprising a SIM card for establishing a voice communication channel with a predefined third party and for providing the third party with a location of the vehicle where the accident occurred;
a speaker/microphone device that is automatically activated when the voice communication channel is established for enabling the operator to communicate with the third party;
wherein the activation of the emergency notification unit by the circuit comprises activating the GSM/GPS system for establishing the voice communication channel and sending the accident location and activating the speaker/microphone for enabling communication with the operator through the voice communication channel.

11. The system as claimed in claim 9, further comprising:
a speed detector for detecting a wheel speed of the vehicle and outputting a wheel speed signal;
wherein the circuit comprises an input/output interface for receiving the wheel speed signal from the speed detector and wherein the serious accident conditions based on which the emergency notification unit is activated by the circuit when detected further comprise when the wheel speed of the vehicle is detected to be higher than a predefined threshold at the occurrence of an accident.

12. The system as claimed in claim 11, wherein the circuit lock the ignition system for a predefined period of time when the serious accident conditions are detected.

13. The system as claimed in claim 12 wherein:
the operator seat detector comprises one or more pressure sensors, optical sensors or thermal sensors;
the accident detector comprises one or more shock detectors; and
the wheel speed detector comprises one or more speed sensors for measuring the rotational speed of one or more vehicle wheels.

14. The system as claimed in claim 13, wherein the circuit comprises a processing unit, wherein the processing unit:
receive real time detection signals from the RFID reader, the helmet presence detector, the speed detector, the accident detector and the operator seat detector;
assess when the safety conditions are met as a function of the real time detection signals received;
assess when the serious accident conditions are met as a function of the real time detection signals received; and activate or deactivate the ignition system and the emergency notification unit as a function of the assessments.

15. The system as claimed in claim 1, wherein the vehicle is a motorcycle, a bike, a personal water craft, or a snowmobile.

16. A safety helmet adapted to be worn by an operator of a vehicle for enhancing safety, the helmet comprising:
an RFID tag adapted to be connected to a RFID reader, the RFID reader adapted to be positioned at the vehicle for detecting whether the helmet is within a proximity distance and for outputting a first helmet status signal;
a helmet presence detector comprising one or more sensors for detecting whether the helmet is being worn by the vehicle operator for outputting a second helmet status signal;
wherein a circuit is adapted to be positioned at the vehicle and to be connected to an ignition system of the vehicle for receiving the first and second helmet status signals and for activating the ignition system of the vehicle when the helmet is detected to be concurrently within the proximity distance and worn by the operator; and
wherein the safety conditions signals received by the circuit comprise the seat status signal, and wherein the safety conditions based on which the ignition system is activated when detected further comprise when the operator is detected to be seated on the vehicle seat.

17. A safety circuit positioned at a vehicle and connected to an RFID reader in communication with an RFID tag positioned at a helmet, a helmet presence detector positioned at the helmet, and at least one of a speed detector for detecting a wheel speed of the vehicle, an accident detector for detecting occurrence of an accident and an operator seat detector for detecting whether a vehicle operator is seated on a vehicle operator seat for:
receiving real time detection signals from the RFID reader, the helmet presence detector, and the at least one of the speed detector, the accident detector and the operator seat detector;
assessing when safety conditions are met as a function of the real time detection signals received, wherein the safety conditions comprise whether the helmet is detected to be concurrently within the proximity distance and worn by the operator and whether the vehicle operator is detected to be seated on the vehicle operator seat;
assessing when serious accident conditions are met as a function of the real time detection signals received, wherein the serious accident conditions comprise at least one of whether the operator is not detected to be on the operator seat at the occurrence of an accident, and whether the wheel speed is above a predefined threshold while the operator is not detected to be on the operator seat at the occurrence of an accident;
activating or deactivating at least one of a vehicle ignition system and an emergency notification unit as a function of the assessments.

18. The safety circuit as claimed in claim 17 wherein the circuit comprises a microcontroller comprising a processing unit and an input/output interface for receiving the detection signals, processing the detection signals for conducting the assessments, and to activating or deactivating the at least one of the ignition system and the emergency notification unit based on a decision made by the processing unit as a function of the assessments.

* * * * *